(12) United States Patent
Davies

(10) Patent No.: US 11,702,861 B2
(45) Date of Patent: Jul. 18, 2023

(54) BARRIER ASSEMBLY

(71) Applicant: ProtectaPet Limited, Stoke-on-Trent (GB)

(72) Inventor: Simon Keith Davies, Stoke-on-Trent (GB)

(73) Assignee: ProtectaPet Limited, Stoke-on-Trent (GB)

( * ) Notice: Subject to any disclaimer, the term of this patent is extended or adjusted under 35 U.S.C. 154(b) by 197 days.

(21) Appl. No.: 17/416,364

(22) PCT Filed: Dec. 20, 2019

(86) PCT No.: PCT/GB2019/053677
§ 371 (c)(1),
(2) Date: Jun. 18, 2021

(87) PCT Pub. No.: WO2020/128524
PCT Pub. Date: Jun. 25, 2020

(65) Prior Publication Data
US 2022/0074227 A1 Mar. 10, 2022

(30) Foreign Application Priority Data

Dec. 20, 2018 (GB) ...................................... 1820790

(51) Int. Cl.
*E04H 17/00* (2006.01)
(52) U.S. Cl.
CPC .................................. *E04H 17/003* (2013.01)
(58) Field of Classification Search
CPC ..... E04H 17/00; E04H 17/003; E04H 17/004; A01M 29/30; A01G 13/10
See application file for complete search history.

(56) References Cited

U.S. PATENT DOCUMENTS

| | | | | |
|---|---|---|---|---|
| 2,199,518 | A * | 5/1940 | Coleman | E04H 17/24 256/11 |
| 4,093,187 | A * | 6/1978 | Robinson | E01F 7/00 256/49 |
| 4,110,944 | A | 9/1978 | Carlson | |
| 6,199,831 | B1 * | 3/2001 | Patrick | A01M 29/30 256/25 |
| 7,461,833 | B1 * | 12/2008 | Gibbs | E04H 17/00 256/22 |

(Continued)

FOREIGN PATENT DOCUMENTS

| | | | |
|---|---|---|---|
| DE | 4203267 A1 * | 8/1992 | |
| FR | 3086962 A1 * | 4/2020 | |

(Continued)

OTHER PUBLICATIONS

GB Application No. 1820790.2, Search Report dated May 31, 2019, 9 pages.

*Primary Examiner* — Jonathan P Masinick
(74) *Attorney, Agent, or Firm* — Han Santos, PLLC

(57) ABSTRACT

A barrier assembly including a bracket member (10) with a base (14) and an inclined upper part (16). An alignment adaptor (36) may be provided which mounts the bracket (10) at an inclination to a mounting surface for instance for use in corners. The bracket member 10 may be mounted on an extension member (68) which enables the bracket member to extend higher than would otherwise be the case.

12 Claims, 17 Drawing Sheets

(56) References Cited

U.S. PATENT DOCUMENTS

| | | | | |
|---|---|---|---|---|
| 8,308,141 B1* | 11/2012 | Mellins | ............... | E04H 17/22 |
| | | | | 256/25 |
| 10,244,733 B1* | 4/2019 | Lillich | ............... | E04H 17/24 |
| 10,858,857 B2* | 12/2020 | Doelling | ............. | G08B 13/122 |
| 2007/0017156 A1* | 1/2007 | Robinson | ............. | E04H 17/003 |
| | | | | 49/55 |
| 2017/0030083 A1* | 2/2017 | Matturro | ................ | E04H 15/58 |

FOREIGN PATENT DOCUMENTS

| | | | | | |
|---|---|---|---|---|---|
| GB | 2577038 A | * | 3/2020 | ........... | E04H 17/003 |
| JP | 2007315163 A | | 12/2007 | | |
| ZA | 200405004 B | | 7/2005 | | |

* cited by examiner

BARRIER ASSEMBLY

This application is a national stage filing of International Application No. PCT/GB2019/053677, filed Dec. 20, 2019, which claims priority to United Kingdom Application No. 201820790.2, filed Dec. 20, 2018. The entire disclosures of the afore-mentioned patent applications are incorporated herein by reference.

This invention concerns improvements in or relating to barrier assemblies, and also kits of parts for forming barrier assemblies.

Overhanging bracket assemblies are often required at the top of a closure such as a fence or wall to prevent animals or people climbing over the closure. Conventionally inclined brackets are used, which brackets include a first part engageable against the closure, and an inclined part extending therefrom which will generally extend upwardly and inwardly. A further top part at a greater inclination to the closure may extend at least generally perpendicularly to the closure.

Conventionally mesh, netting, wires or other barrier materials may be provided extending between the brackets. Existing arrangements often require a number of different brackets usable in different situations. For instance inclined brackets may be required for use in corners where the bracket inclined part will usually be required to extend at an inclination in a required direction of around 45° to the first part. Also longer brackets may be needed for instance for lower height closures.

According to a first aspect of the invention there is provided a barrier assembly, the assembly comprising a bracket member which comprises a first mounting part and a second barrier part extending in use at a vertical inclination relative thereto, the assembly also including an alignment adaptor mountable to a surface of a closure member, with the bracket member mountable to the alignment adaptor, such that the mounting part is inclined relative to the closure member surface, about a vertical axis.

The alignment adaptor may include a first formation mountable to the surface of a closure member, and a second formation to which a bracket member is mountable.

The first formation may include a plurality of through holes through which a fastening means can extend. The second formation may include an engagement face against which a barrier member can engage, which engagement face will be inclined relative to the surface of a closure member to which the alignment adaptor is mounted.

The engagement face may extend at substantially 45° to the surface of a closure member to which the alignment adaptor is mounted.

The engagement face may be configured such that it can be inclined in either direction relative to the surface of a closure, and may be movable between inclinations in either direction by rotating through 180°.

The second formation may include a plurality of holes, which may be threaded.

In one arrangement the alignment adaptor is in the form of a hollow body which is at least generally triangular in plan view. The hollow body may be made of a plastics material.

In a further arrangement the alignment adaptor may have a generally L shaped configuration. The connection between the limbs of the L may be inclined, and the second formation may be provided in the inclined connection.

According to a second aspect of the invention there is provided a bracket member comprising a first mounting part, and a second barrier part extending at a vertical inclination relative thereto, the assembly also including an extension member, which extension member is mountable on a closure member, with a bracket member mountable to the extension member so as to extend higher than if the bracket member was mounted directly to the closure member.

Third mounting formations may be provided on the extension member to enable mounting of the extension member to a closure, and the third mounting formations may comprise a plurality of spaced holes.

A base formation may be provided on the extension member to receive the lower end of a bracket member mounted thereto.

The extension member may have a base part locatable against a closure member, with side walls extending from the base part such that a bracket member can slidingly locate between the side walls. The side walls may taper outwardly in an upwards direction. Inward projections may be provided on the side walls to retain a bracket member therebetween.

According to a third aspect of the invention there is provided a bracket member comprising a first mounting part, and a second barrier part extending in use at a vertical inclination relative thereto, the bracket member having a generally channel section profile with a base and side walls.

The side walls may taper outwardly on the mounting part towards the barrier part. The side walls may taper inwardly on the barrier part away from the mounting part.

The bracket member may also include a third part extending from the barrier part at a greater inclination to the mounting part. The side walls of the third part may taper inwardly away from the barrier.

A plurality of adjacent through holes may be provided in the base and side walls of the barrier part, to permit mounting of items to the bracket member. Adjacent through holes may also be provided in the third part of the barrier member.

The base of the bracket member channel section may be profiled and may have a raised central section which may extend for the majority of the width of the channel section.

The side walls of the channel section may be inclined outwardly.

The bracket members may be made of metal and for instance steel, and may be made by stamping or pressing.

The extension members may be made of metal and for instance steel, and may be made by stamping or pressing.

According to a still further aspect of the invention there is provided a first kit of parts for forming a barrier assembly, the kit of parts including a plurality of bracket members and alignment adaptors according to any of the preceding paragraphs.

According to a yet further aspect of the invention there is provided a second kit of parts for forming a barrier assembly, the kit of parts including a plurality of bracket members and extension members according to any of the preceding paragraphs.

The second kit of parts may also include a plurality of alignment adaptors.

The invention further provides a barrier assembly including a plurality of bracket members according to any of the preceding paragraphs, with barrier means extending between the bracket members.

The barrier assembly may also include one or more extension members.

The barrier assembly may also include one or more alignment adaptors.

Embodiments of the present invention will now be described by way of example only and with reference to the accompanying drawings, in which:—

Figure 8:
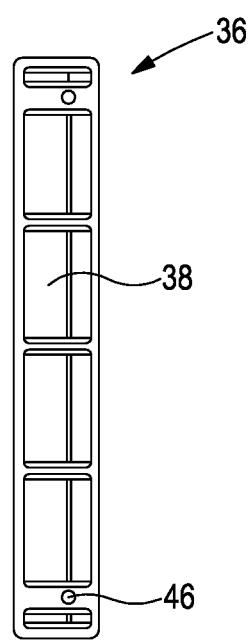
FIG. 8 is a front view of a first alignment adaptor according to the invention.
Figure 9:
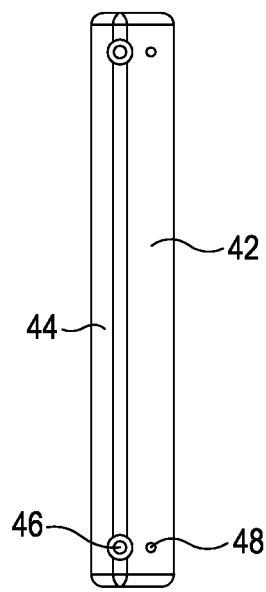
FIG. 9 is a diagrammatic rear view of the adaptor of FIG. 8.
Figure 10:
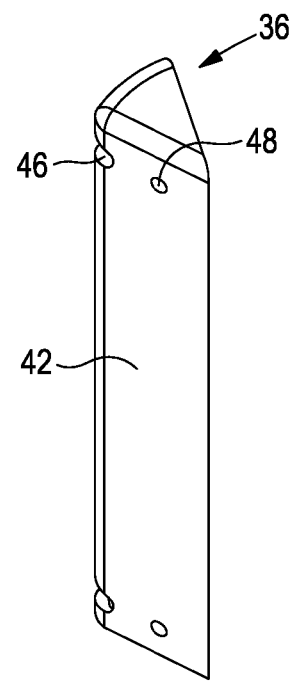
FIG. 10 is a diagrammatic perspective view of the adaptor of FIG. 8.
Figure 11:
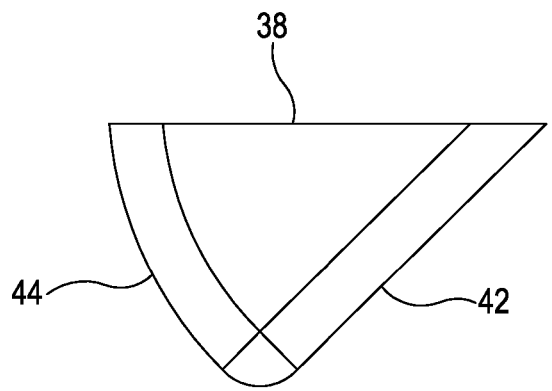
FIG. 11 is a diagrammatic plan view of the adaptor of FIG. 8.
Figure 12:
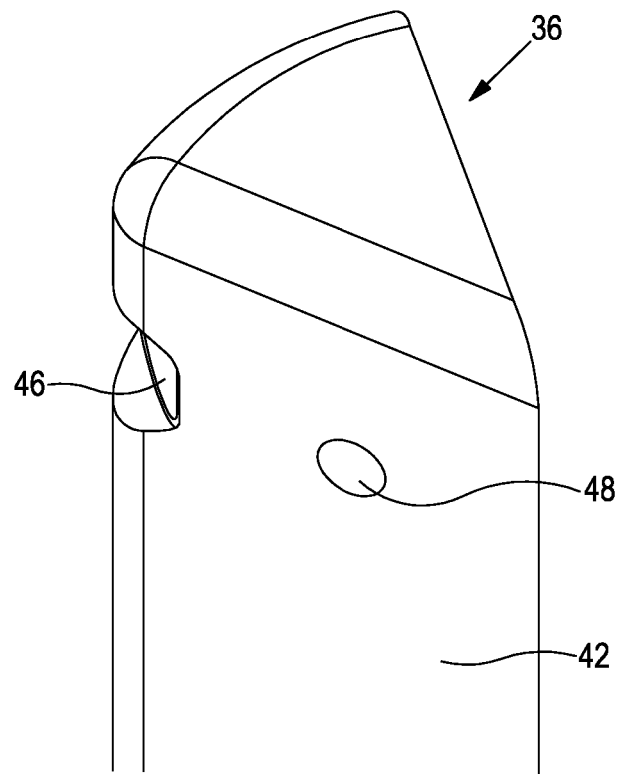
FIG. 12 is a more detailed diagrammatic perspective view of an upper part of the adaptor of FIG. 8.
Figure 16:
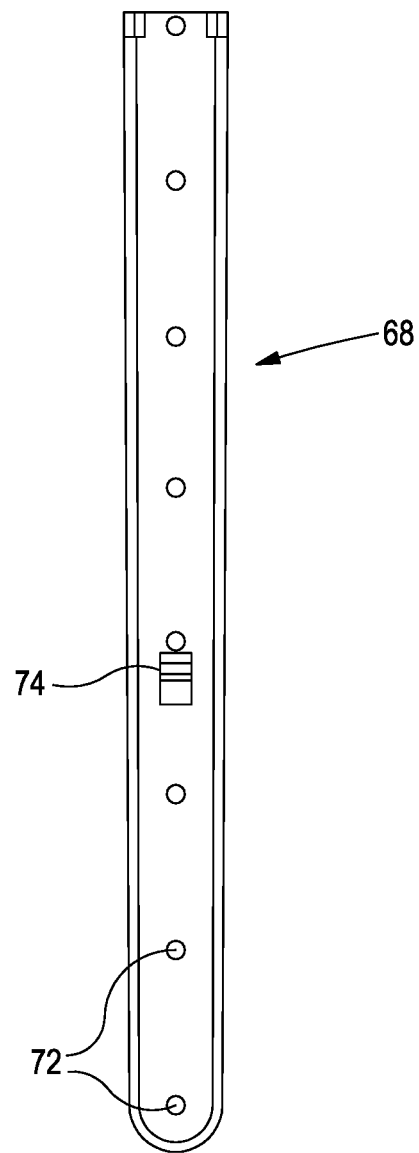
FIG. 16 is a diagrammatic front view of an extension member according to the invention.

The drawings show various barrier assemblies and components used therein to provide an overhanging barrier arrangement. The assembly in particular comprises one or more of bracket members (FIG. 1), an alignment adaptor (FIG. 8) and/or an extension member (FIG. 16).

Figure 1:
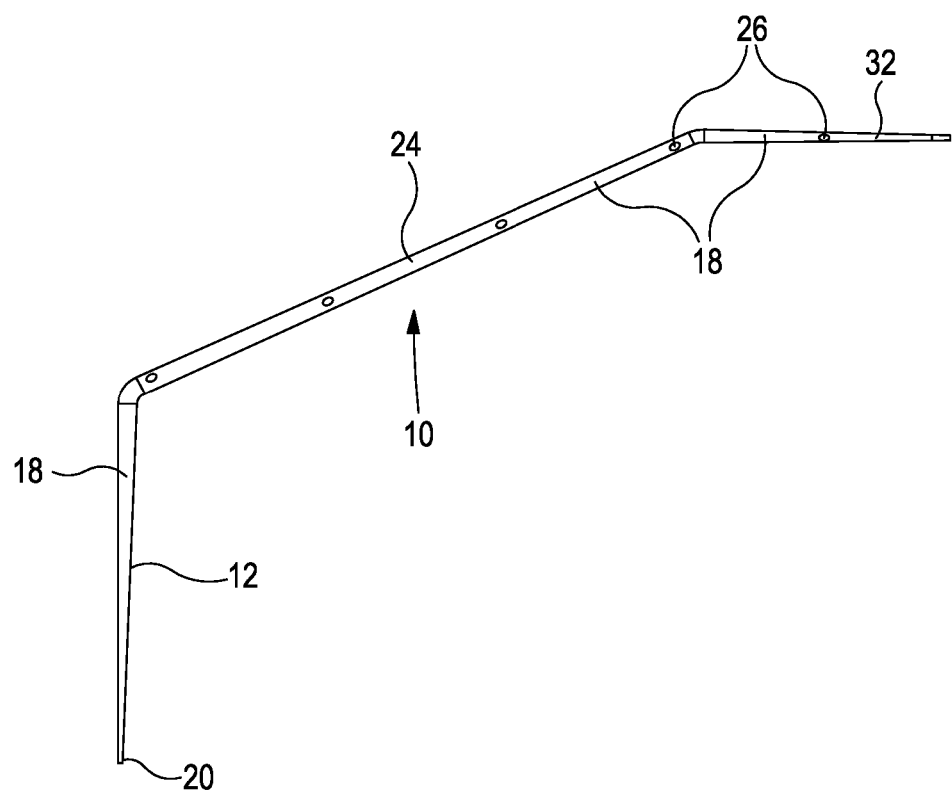
FIG. 1 is a diagrammatic side view of a bracket member according to the invention.
Figure 2:
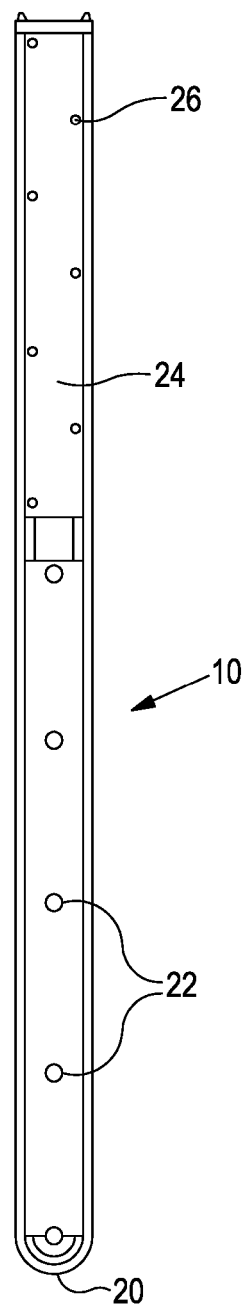
FIG. 2 is a front view of the bracket member of FIG. 1.
Figure 3:
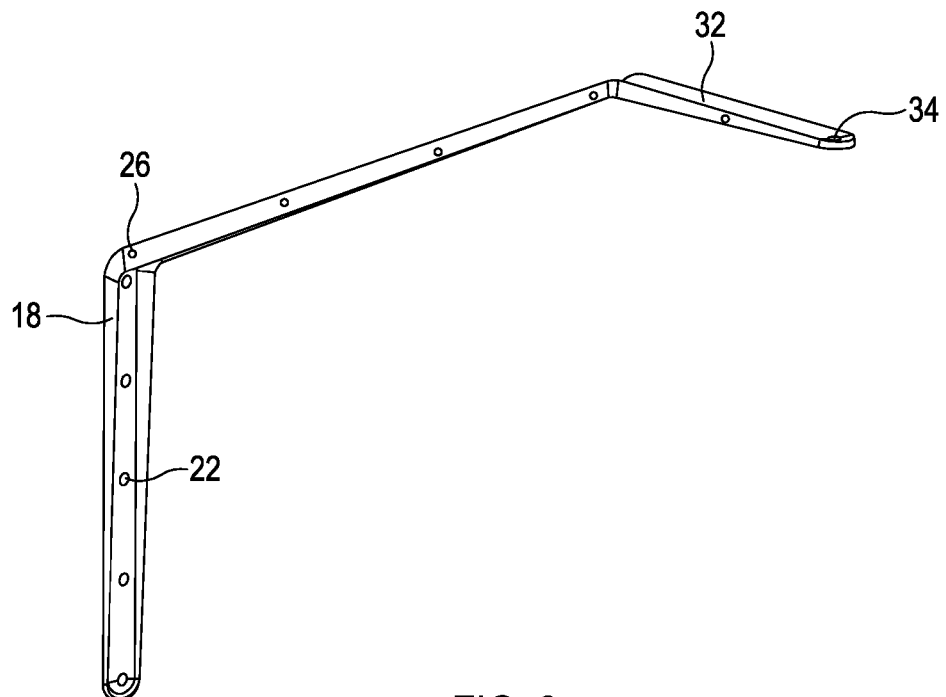
FIG. 3 is a diagrammatic perspective view of the bracket member of FIG. 1.
Figure 4:
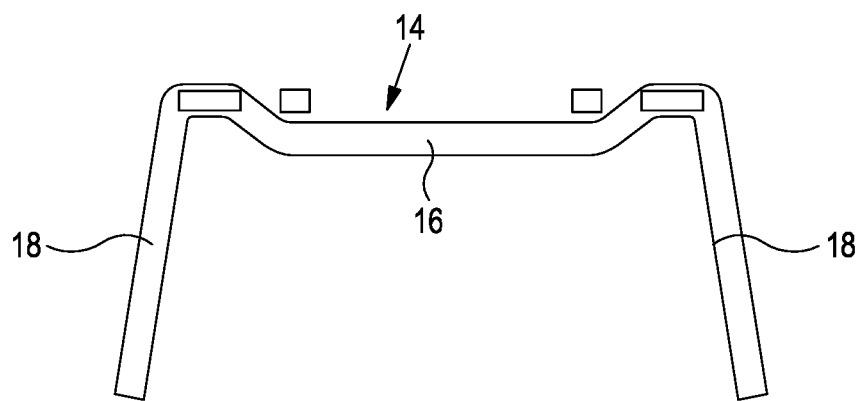
FIG. 4 is a diagrammatic cross sectional plan view of part of the bracket member of FIG. 1.
Figure 5:
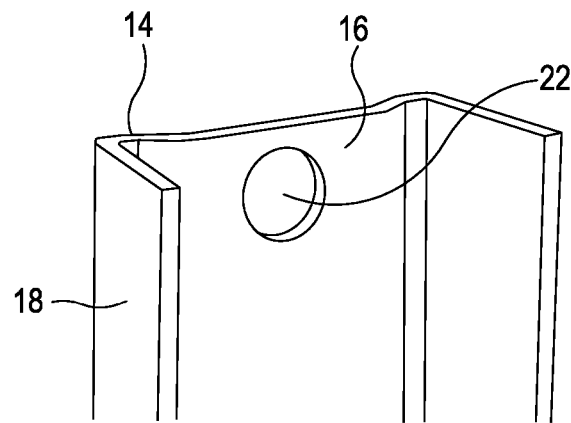
FIG. 5 is a diagrammatic sectional view of part of the bracket member of FIG. 1.

FIG. 1 shows a bracket 10 member comprises a first mounting part 12 formed of a generally channel cross section as shown in FIG. 4, with a base 14 with an upper raised part 16 and side walls 18 which diverge gently outwardly. The side walls 18 increase in height away from their lower end 20 in use. A plurality of spaced mounting holes 22 are provided in the base 14 of the mounting part 12. The mounting part 12 connects to a barrier part 24 which is inclined relative to the mounting part to provide an overhang in use. The side walls 18 reduce gently in height in the barrier part 24 away from the mounting part 12.

Figure 6:
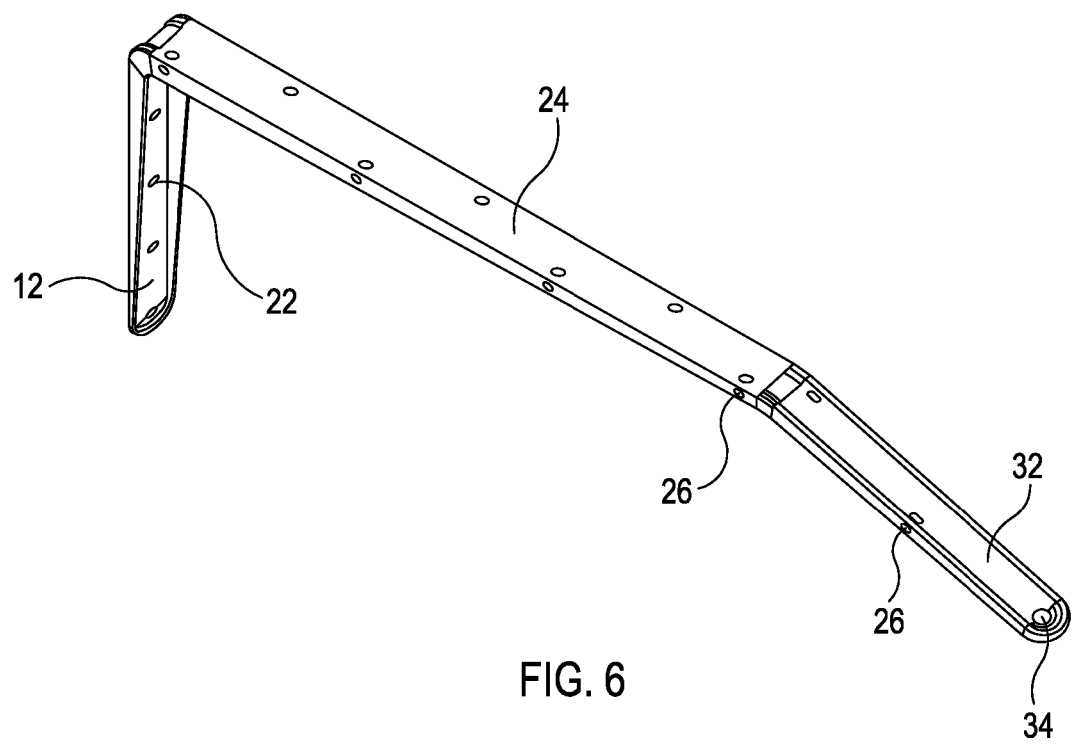
FIG. 6 is a diagrammatic perspective view of the bracket member of FIG. 1.
Figure 7:
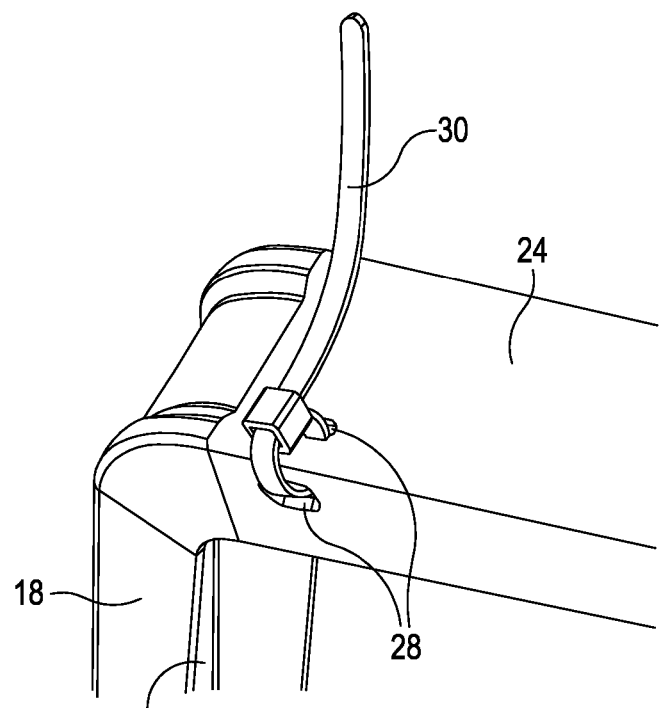
FIG. 7 is a more detailed diagrammatic perspective view of part of the assembly of FIG. 1.

A plurality of spaced pairs 26 of adjacent fixing holes 28 are provided respectively in the base 14 of the channel of the barrier part, and adjacent in respective side wall 18 for mounting a cable tie 30 as shown for example in FIG. 7, to mount an item or material to the bracket member 10. As can be seen from FIG. 6 the pairs 26 of fixing holes are provided alternately on opposite sides of the barrier part 24.

A further top part 32 extends from the free end of the barrier part 24 and again the height of the side walls 18 decreases gently along the top part 32, and a pair 26 of adjacent fixing holes are provided on each side, with a final mounting hole 34 at the end of the top part 32.

The bracket members 10 may be formed by stamping or pressing of galvanised steel. The formation of the base 14 of the channel has been found to provide significant additional strength relative to a non profiled channel, which therefore permits thinner material to be used whilst obtaining equal or enhanced performance. This therefore provides a weight and cost reduction.

FIGS. 8 to 11 show a first alignment adaptor 36 which is in the form of a profiled open body of a glass filled plastics material made for instance by injection moulding. The alignment adaptor 36 provides an open surface 38 engageable against a fence post 40 or the like. The adaptor 36 also provides a flat engagement face 42 inclined at substantially 45° to the open surface 38. A gently curved face 44 extends between the open surface 38 and engagement face 42. A pair of mounting holes 46 are provided in the junction between the engagement face 42 and curved face 44, to permit mounting of the adaptor 36 to a fence post 40 or similar. A further pair of holes 48 are provided in the engagement face 42, which holes 48 are threaded to permit a bracket member 10 to be mounted to the alignment adaptor 36, by screws engaging in the holes 48.

Figure 23:
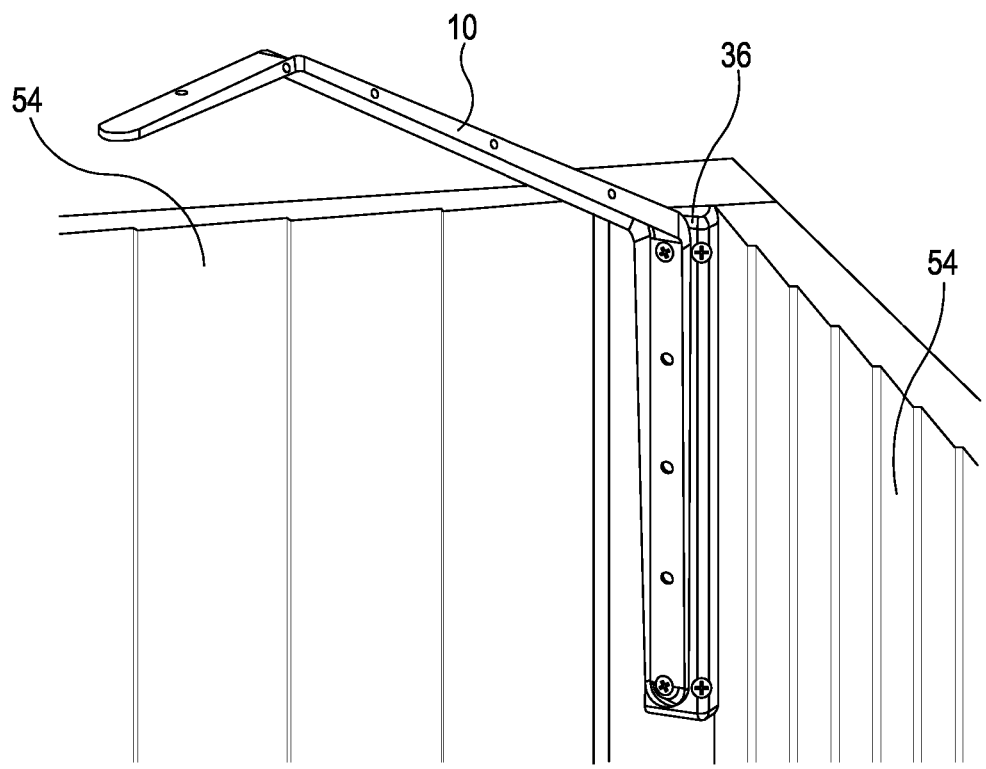
FIG. 23 is a diagrammatic perspective view of part of the arrangement of FIG. 21.
Figure 24:
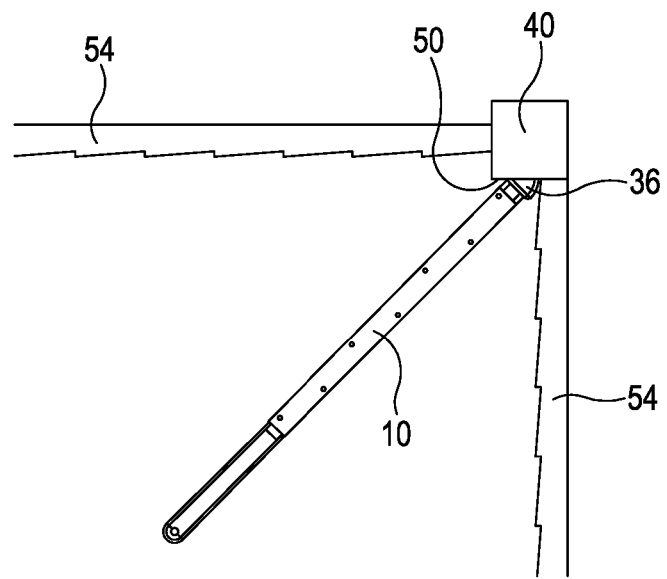
FIG. 24 is a diagrammatic plan view of the part of the assembly shown in FIG. 23.

FIGS. 23 and 24 show a corner adaptor mounted 36 on a face 50 of a square fence post 40, thereby meaning that the bracket member 10 extends at 45° relative to the two perpendicular sides 54 of a fence which meet at the fence post 40.

Figure 13:
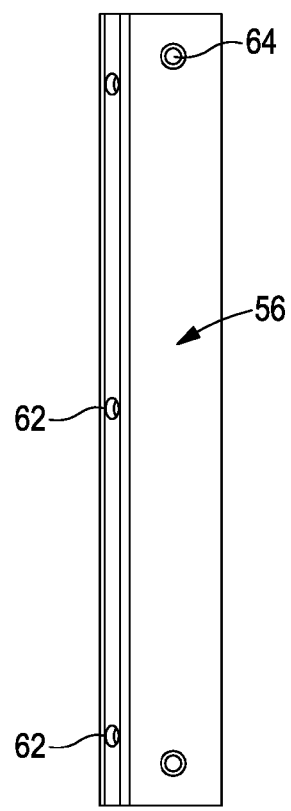
FIG. 13 is a diagrammatic front view of a second alignment adaptor according to the invention.
Figure 14:
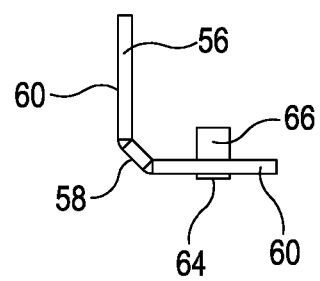
FIG. 14 is a diagrammatic plan view of the adaptor of FIG. 13.
Figure 15:
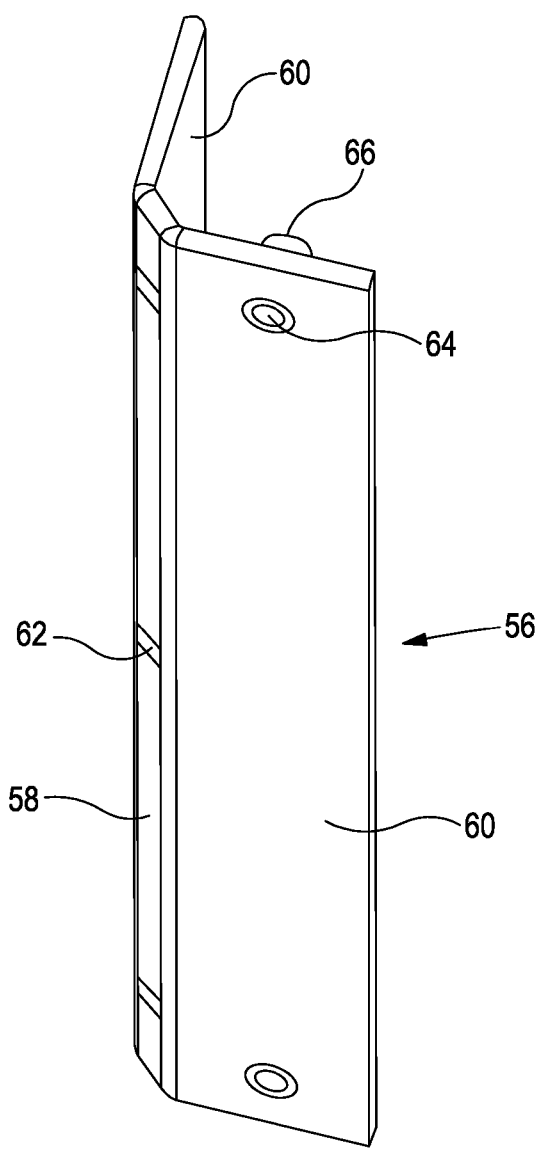
FIG. 15 is a diagrammatic perspective view from above of the adaptor of FIG. 15.

FIGS. 13 to 15 show a second alignment adaptor 56. In this instance the alignment adaptor 56 has a generally L shape cross section in plan view, except that there is an inclined web 58 between the two limbs 60 of the L shape, defining the apex of the L. Three mounting holes 62 are provided in the web 58 to permit mounting of the adaptor 56 to a fence post 40 or the like. A pair of mounting holes 64 are provided on a one of the limbs 60 of the L with a threaded boss 66 to permit a bracket member 10 to be mounted thereto. The second alignment adaptor 56 is formed for instance of folded steel.

Figure 17:
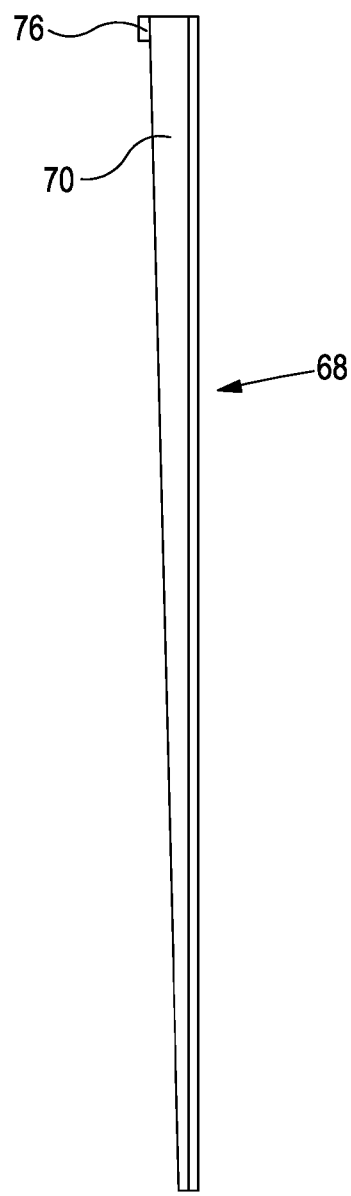
FIG. 17 is a diagrammatic side view of the extension member of FIG. 16.
Figure 18:
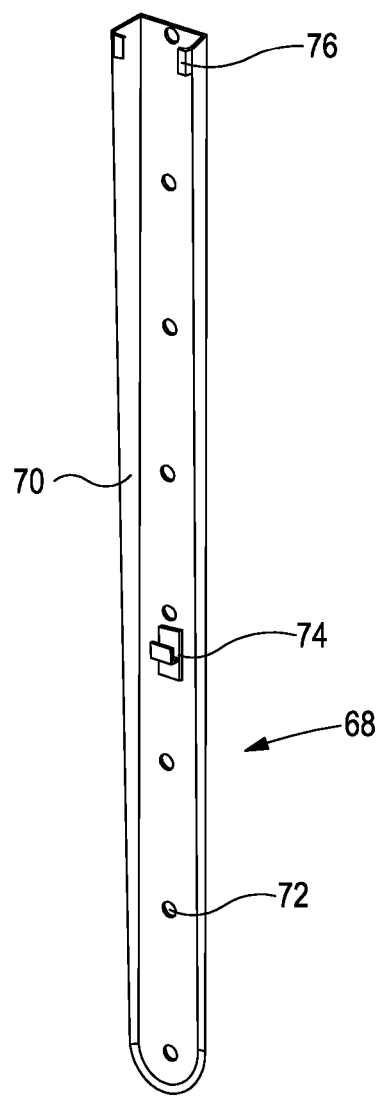
FIG. 18 is a diagrammatic perspective view of the extension of FIG. 16.
Figure 19:
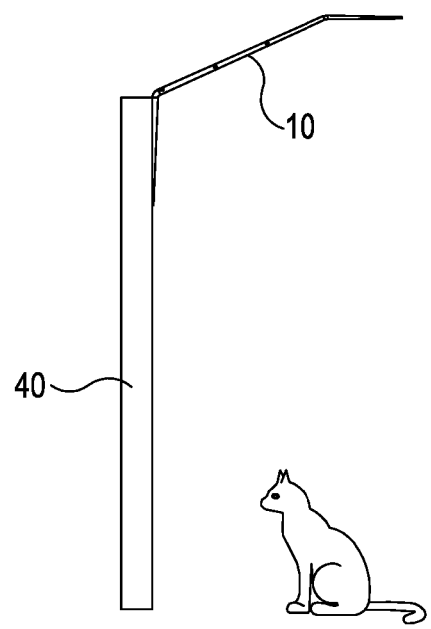
FIG. 19 is a diagrammatic side view showing the use of a barrier assembly according to the invention.

FIGS. 16 to 18 show an extension member 68 which enables a bracket member 10 to extend higher than would otherwise be the case. The extension member 68 is formed of plain channel section with the height of the side walls 70 increasing upwardly in use. A plurality of mounting holes 72 are provided in the base of the channel of the extension member 68, to permit mounting thereof to a fence post 40 or the like, or an alignment adaptor 36, 56. Spaced upwardly from the lower end of the extension member 68 is an outwardly extending flap 74 to supportingly receive the lower end of a bracket member 10 mounted thereto. A pair of folded tabs 76 are provided extending inwardly from the side walls 70 of the channel at an upper end of the extension member 68. An extension member 68 can again be provided by stamping or pressing galvanised steel.

Figure 25:
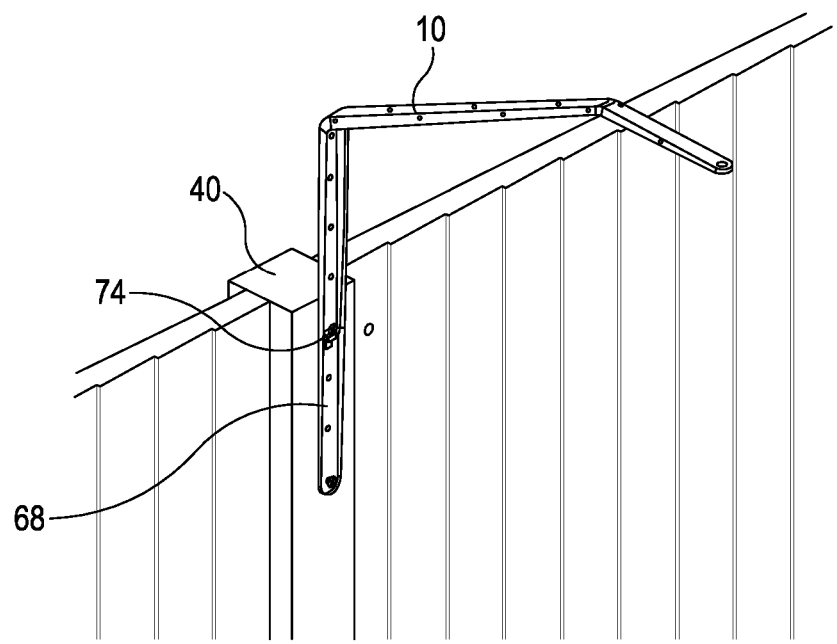
FIG. 25 is a diagrammatic perspective view of a further barrier assembly according to the invention.
Figure 26:
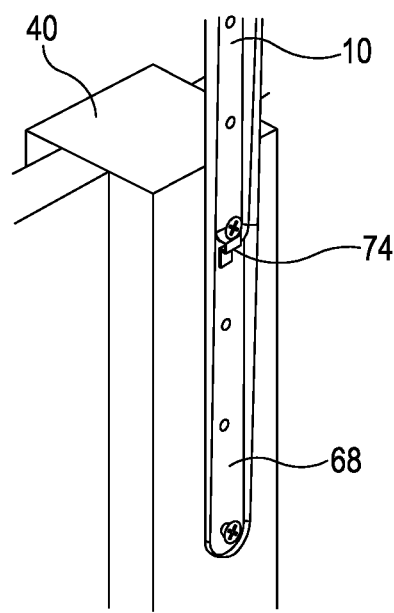
FIG. 26 is a more detailed view of part of the assembly of FIG. 25.
Figure 27:
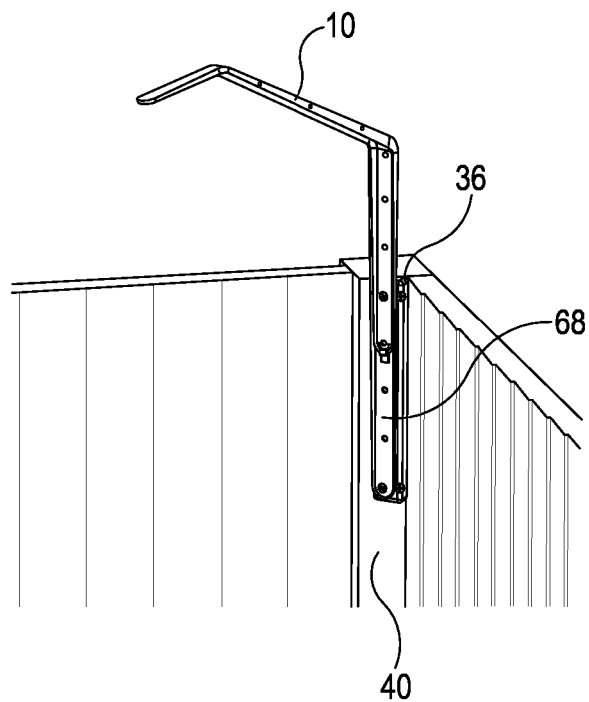
FIG. 27 is a diagrammatic perspective view of part of a still further barrier assembly according to the invention.
Figure 28:
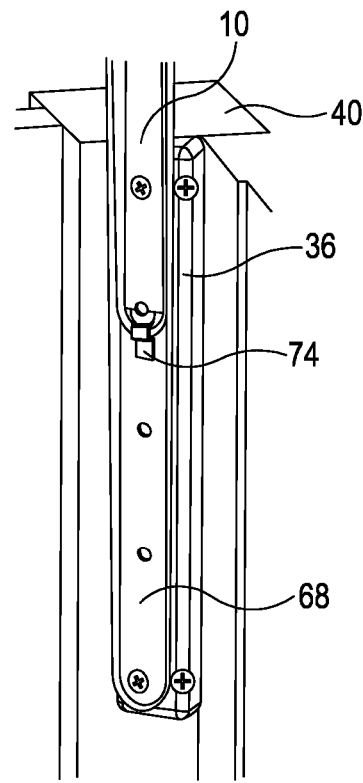
FIG. 28 is a more detailed view of part of the assembly of FIG. 27.

A bracket member 10 can be mounted to the extension member 68 by sliding the lower end of the mounting part 12 so as to engage against the flap 74, with the tabs 76 retaining the bracket member 10 in a sliding fit relative to the channel of the extension member 68. Screws can then pass through a hole 22 in the base 14 of the bracket member 10 and the extension member 68, to engage in a fence post 40 for example as shown in FIGS. 25 and 26, or an alignment adaptor 36 as shown for instance in FIGS. 27 and 28.

Figure 20:
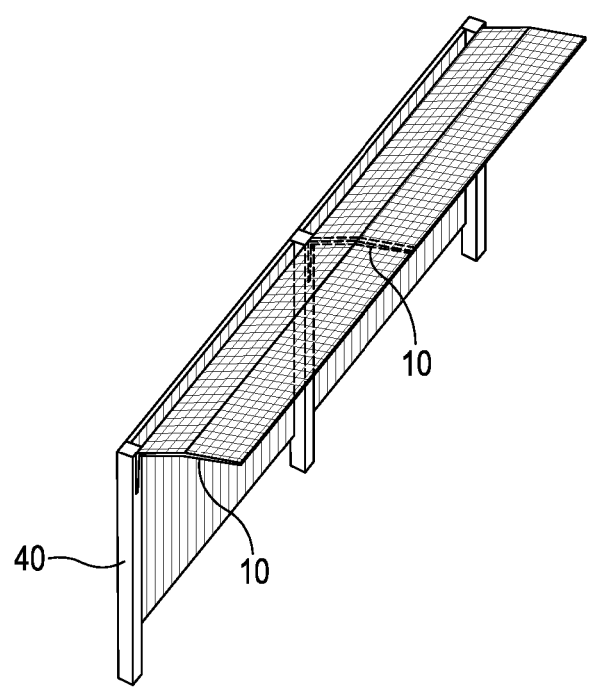
FIG. 20 is a diagrammatic perspective view from above of a first arrangement of a barrier assembly according to the invention.
Figure 21:
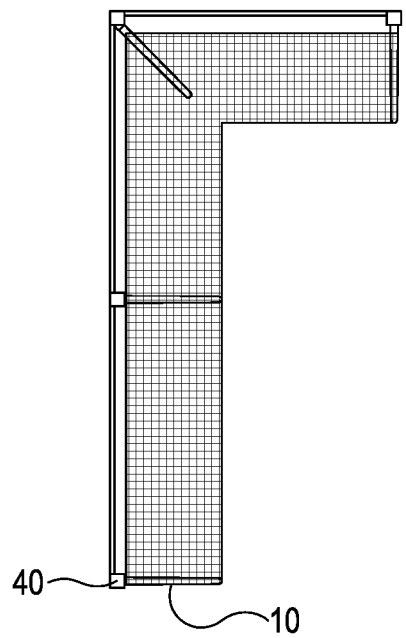
FIG. 21 is a plan view of a further configuration of a barrier assembly according to the invention.
Figure 22:
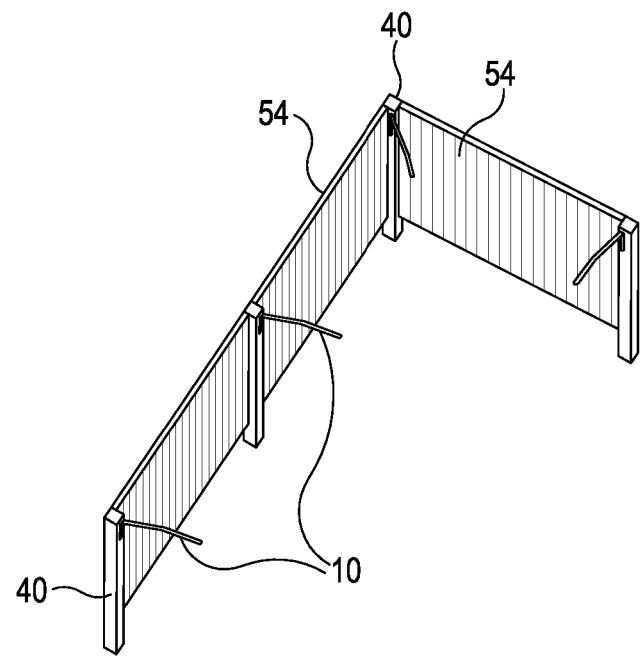
FIG. 22 is a diagrammatic perspective view from above of the arrangement of FIG. 21 but with some components removed.

Therefore a barrier assembly is provided which can be formed from a number of bracket members, alignment adaptors and/or extension members. This permits the same bracket members to be usable in a straight section of fencing such as shown for instance in FIG. 20, or in corners as shown for instance in FIGS. 21 to 24. The extension members enable the same bracket members to be used for instance with lower fences or walls. Therefore a kit of parts can be provided with only two or three different components but which can be used in combination as required.

A range of modifications may be made without departing from the scope of the invention. For instance the bracket members may take a different form. As indicated the alignment adaptors can take different forms, and it is to be realised that both forms described can simply be turned through 180° for use in an opposite handed corner. The extension members may take a different form, and could for instance be of a different size if required.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A barrier assembly, the barrier assembly comprising:
   a bracket member which comprises a first mounting part and a second barrier part extending in use at a vertical inclination relative thereto; and
   an alignment adaptor mountable to a surface of a closure member, with the bracket member mountable to the alignment adaptor such that the first mounting part is inclined relative to the surface of the closure member about a vertical axis,
   wherein the alignment adaptor comprises an open surface engageable against the closure member and a flat engagement face inclined relative to the open surface, the flat engagement face being engageable with the bracket member.

2. The barrier assembly according to claim 1, wherein the open surface includes a plurality of through holes through which one or more fasteners are configured to extend.

3. The barrier assembly according to claim 1, wherein the flat engagement face will be inclined relative to the surface of the closure member to which the alignment adaptor is mounted.

4. The barrier assembly according to claim 3, wherein the flat engagement face extends at substantially 45° to the surface of the closure member to which the alignment adaptor is mounted.

5. The barrier assembly according to claim 4, wherein the flat engagement face is configured to be inclined in either direction relative to the surface of a closure.

6. A barrier assembly according to claim 4, wherein the flat engagement face includes a plurality of holes.

7. The barrier assembly according to claim 1, wherein the alignment adaptor is in a form of a hollow body which is substantially triangular with a curved face.

8. The barrier assembly accordingly to claim 1, further comprising one or more additional bracket members and a barrier extending between the bracket member and one of the one or more additional bracket members.

9. The barrier assembly according to claim 8, further comprising one or more additional alignment adaptors.

10. The barrier assembly according to claim 1, wherein a curved face extends between the open surface and the flat engagement face.

11. The barrier assembly according to claim 10, wherein the open surface includes a plurality of through holes through which one or more fasteners are configured to extend, and wherein the plurality of through holes comprise a pair of mounting holes provided in a junction between the flat engagement face and the curved face, to permit mounting of the alignment adaptor to a fence post.

12. A kit of parts for forming a barrier assembly, the kit of parts including:
   one or more bracket members, each bracket member comprising a first mounting part and a second barrier part extending in use at a vertical inclination relative thereto; and
   one or more alignment adaptors, each alignment adaptor mountable to a surface of a closure member, with the bracket member mountable to the alignment adaptor such that the first mounting part is inclined relative to the surface of the closure member about a vertical axis,
   wherein an alignment adaptor comprises an open surface engageable against a corresponding closure member and a flat engagement face inclined relative to the open surface, the flat engagement face being engageable with a corresponding bracket member.

* * * * *